United States Patent Office 2,966,527
Patented Dec. 27, 1960

2,966,527

PREPARATION OF BICYCLOALKADIENES

Louis Schmerling, Riverside, Ill., assignor, by mesne assignments, to Universal Oil Products Company, Des Plaines, Ill., a corporation of Delaware No Drawing. Filed Oct. 9, 1956, Ser. No. 614,796

11 Claims. (Cl. 260—666)

This application is a continuation-in-part of my copending application Serial No. 400,793 filed December 28, 1953, now abandoned.

This invention relates to a process for the preparation of bicycloalkadienes and more particularly to a process for preparing bicycloalkadienes by dehalogenating certain dihalobicycloalkenes.

An object of this invention is to prepare bicycloalkadienes from dihalobicycloalkenes which have been produced by condensing a conjugated cycloalkadiene with certain dihaloalkenes.

A further object of this invention is to prepare bicycloalkadienes or alkyl bicycloalkadienes by dehalogenating the corresponding dihalobicycloalkenes which have been prepared by condensing conjugated cycloalkadienes with certain dihaloalkenes.

One embodiment of this invention resides in a process for the preparation of a non-conjugated bicycloalkadiene which comprises reacting a dehalogenating agent with a dihalobicycloalkene produced by the condensation of a conjugated cycloalkadiene with a dihaloalkene having the general formula:

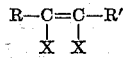

in which R and R' are independently selected from the group consisting of hydrogen and alkyl radicals and X is a halogen radical, and recovering the resultant non-conjugated bicycloalkadiene.

A further embodiment of the invention resides in a process for the preparation of a non-conjugated bicycloalkadiene which comprises reacting a dehalogenating agent with a dichlorobicycloalkene produced by the condensation of a conjugated cycloalkadiene with a dichloroalkene having the general formula:

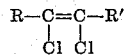

in which R and R' are independently selected from the group consisting of hydrogen and alkyl radicals, and recovering the resultant non-conjugated bicycloalkadiene.

A specific embodiment of the invention is found in a process for preparing a non-conjugated bicycloalkadiene by reacting a dehalogenating agent with a dihalobicycloalkene produced by the condensation of a congugated 1,3-cyclopentadiene with a dihaloalkene having the general formula:

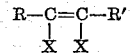

in which R and R' are independently selected from the group consisting of hydrogen and alkyl radicals and X is a halogen radical, and recovering the resultant non-conjugated bicycloalkadiene.

A specific embodiment of the invention is found in a process for preparing bicyclo[2.2.1]-2,5-heptadiene which comprises reacting 5,6-dichlorobicyclo[2.2.1]-2-heptene, produced by the condensation of 1,3-cyclopentadiene with a 1,2-dichloroethylene, with magnesium and magnesium iodide in absolute ether, and recovering the resultant bicyclo[2.2.1]-2,5-heptadiene.

Other objects and embodiments referring to alternative conjugated cycloalkadienes and alternative polyhaloalkenes will be found in the following further detailed description of the invention.

Heretofore it was not believed possible to prepare bicycloalkadienes from the condensation product of a conjugated cycloalkadiene and a haloalkene due to the fact that the halogen in the 5 position on the bicyclo ring possessed a marked degree of inertness. For example, when 5-chlorobicyclo[2.2.1]-2-heptene was treated with a solution of potassium hydroxide in ethyl alcohol no reaction occurred and the dehydrohalogenation of this compound to form bicyclo[2.2.1]-2,5-heptadiene was not accomplished. This would be illustrated by the following equation:

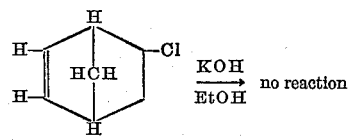

On the other hand, the dehydrohalogenation of a bicyclic compound can be accomplished if the compound is polyhalogenated. For example, if vinyl chloride is condensed with hexachlorocyclopentadiene the resultant 1,2,3,4,5,7,7-heptachlorobicyclo[2.2.1]-2-heptene can be dehydrochlorinated in the presence of potassium hydroxide and ethyl alcohol to yield 1,2,3,4,7,7-hexachlorobicyclo[2.2.1]-2,5-heptadiene as shown by the following equations:

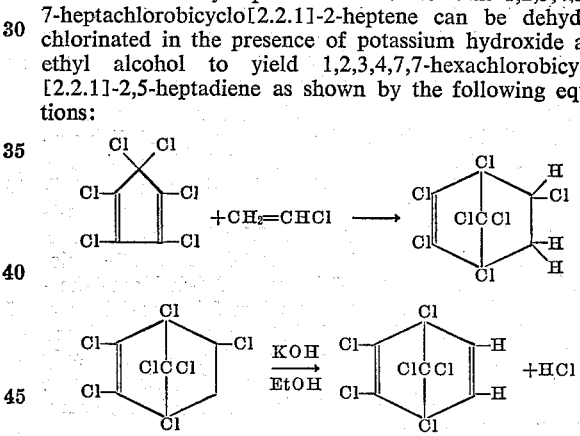

However, this dehydrohalogenation, as hereinbefore stated, is only possible due to the presence of the other halogen atoms on the ring. In view of the aforesaid inertness of the halogen radical in the 5-position when there are no halogens in 1-, 2-, 3-, 4-, and 7,7-positions, it is surprising and unexpected that dehalogenation of a 5,6-dihalobicyclo[2.2.1]-2-heptene can be accomplished by treating said compound with a dehalogenating agent according to the process of this invention, as illustrated in the following equation:

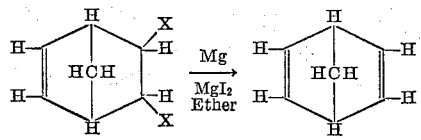

The products of this dehalogenation, which may comprise compounds such as bicyclo[2.2.1]-2,5-heptadiene, bicyclo[2.2.2]-2,5-octadiene or alkyl substituted derivatives thereof are useful as intermediates in the preparation of many types of compounds such as insecticides, polymers, resins, etc., which are important in the chemical and allied industries. For example, bicyclo[2.2.1]-2,5-heptadiene may be reacted with hexachlorocyclopentadiene to form a tetracyclic compound such as 1,2,3,4,10, 10 - hexachloro - 1,4,4a,5,8,8a - hexahydro - 1,4,5,8 - dimethanonaphthalene which is used as an insecticide.

The intermediate halogenated compounds (dihalobicycloalkenes) which are useful for the preparation of the compounds of the present invention may be prepared by the condensation of a dihaloalkene with a conjugated cycloalkadiene, preferably 1,3-cyclopentadiene or 1,3-cyclohexadiene or alkyl derivatives thereof such as 1-methyl-1,3-cyclopentadiene, 1-ethyl-1,3-cyclopentadiene, 1-propyl-1,3-cyclopentadiene, 5-methyl-1,3-cyclopentadiene, 5-ethyl-1,3-cyclopentadiene, 5-propyl-1,3-cyclopentadiene, 1,2-dimethyl-1,3-cyclopentadiene, 1,3-dimethyl-1,3 - cyclopentadiene, 1,5 - dimethyl-1,3-cyclopentadiene, 1,2 - diethyl - 1,3 - cyclopentadiene, 1,3-diethyl-1,3-cyclopentadiene, 1,5-diethyl-1,3-cyclopentadiene, 1-methyl-2-ethyl - 1,3 - cyclopentadiene, 1-methyl-3-ethyl-1,3-cyclopentadiene, 1-methyl-5-ethyl-1,3-cyclopentadiene, 5,5-dimethyl-1,3-cyclopentadiene, etc.; 1-methyl-1,3-cyclohexadiene, 2-methyl-1,3-cyclohexadiene, 5-methyl-1,3-cyclohexadiene, 1-ethyl-1,3-cyclohexadiene, 2-ethyl-1,3-cyclohexadiene, 5-ethyl-1,3-cyclohexadiene, 1,2-dimethyl-1,3-cyclohexadiene, 1,3-dimethyl-1,3-cyclohexadiene, 1,4-dimethyl - 1,3-cyclohexadiene, 1,5-dimethyl-1,3-cyclohexadiene, 1,2 - diethyl-1,3-cyclohexadiene, 1,3-diethyl-1,3-cyclohexadiene, 1,4 - diethyl - 1,3-cyclohexadiene, 1,5-diethyl - 1,3-cyclohexadiene, 5,5-dimethyl-1,3-cyclohexadiene, etc.

The aforementioned conjugated cycloalkadienes are condensed with a polyhaloalkene having the formula:

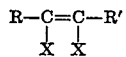

in which R and R' are independently selected from the group consisting of hydrogen and alkyl radicals and X is a halogen radical, the preferred halogens comprising chlorine or bromine. Such dihaloalkenes include trans-1,2-dichloroethylene, cis-1,2-dichloroethylene, trans-1,2-dibromoethylene, cis-1,2-dibromoethylene, 1,2-dichloro-1-propene, 1,2-dibromo-1-propene, 1,2-dichloro-1-butene, 1,2 - dibromo - 1 - butene, 2,3-dichloro-2-butene, 2,3-dibromo-2-butene, 1,2-dichloro-1-pentene, 1,2-dibromo-1-pentene, 2,3-dichloro-2-pentene, 2,3-dibromo-2-pentene, 1,2-dichloro-1-hexene, 1,2-dibromo-1-hexene, 2,3-dichloro-2-hexene, 2,3-dibromo-2-hexene, 3,4-dichloro-3-hexene, 3,4-dibromo-3-hexene, 2-chloro-3-bromo-2-butene, etc. It is to be understood that the above mentioned dihaloalkenes and conjugated cycloalkadiene are only representatives of the class of compounds which may be used, and that the process of this invention is not necessarily limited thereto.

Condensation of a conjugated cyclopentadiene with a dihaloalkene yields a dihalobicyclo[2.2.1]-2-heptene while condensation of a conjugated cyclohexadiene with a polyhaloalkene yields a dihalobicyclo[2.2.2]-2-octene. For example, the condensation of the aforementioned cyclopentadiene and cyclohexadiene with 1,2-dichloroethylene to form 5,6 - dichloro-bicyclo[2.2.1]-2-heptene and 5,6-dichlorobicyclo[2.2.2]-2-octene is shown by the following equations:

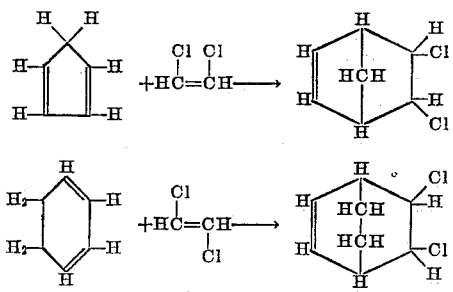

The dehalogenation of the dihalobicycloalkenes to obtain the desired bicyclo[2.2.1]-2,5-heptadienes, bicyclo-[2.2.2]-2,5-octadienes and their alkyl substituted counterparts may be accomplished in a number of ways, usually by treatment with a metal. A preferred method of the present invention consists in treating the dihalide with magnesium metal and a catalytic amount of magnesium iodide or iodine in an organic solvent such as anhydrous ethyl ether. This reaction is carried out at atmospheric pressure and at a temperature in the range of from about 0° to about 50° C., about 20° to about 35° C. being the preferred operating temperature. Inasmuch as the reaction is exothermic in nature, cooling means must be provided in order that the temperature of the reaction be maintained at room temperature or below during the course of the reaction.

The dehalogenation may be effected in any suitable manner and may be either a batch or continuous type of operation. When a batch type operation is used, a quantity of the starting materials, namely, the magnesium metal and the organic solvent such as absolute ether are placed in a reaction vessel equipped with stirring means. Iodine is then added to the mixture to form the magnesium iodide essential to the reaction. The dihalobicycloalkene is then slowly added to the reaction vessel while said vessel is maintained at the desired temperature. After a predetermined reaction time has elapsed, the desired product is separated from unreacted material and recovered by conventional means, for example, by fractional distillation.

Another method of operation of the present process is of the continuous type. In this method of operation the desired dihalobicycloalkene and the iodine and absolute ether, along with the magnesium metal are continuously charged to a reaction zone maintained at suitable separating conditions. The reaction zone may be an unpacked vessel or coil, or it may contain an adsorbent packing material such as fire brick, aluminum, dehydrated bauxite and the like. The dehalogenated bicycloalkadiene is separated from the reactor effluent after a predetermined reaction time has elapsed, and the unconverted materials may be recycled to the reaction zone to form a portion of the starting material. A modification of the above mentioned process is found in the process of forming the magnesium iodide in situ in the organic solvent and then charging the resultant mixture to the reaction zone together with the dihalobicycloalkene.

The following examples are given to illustrate the process of the present invention, which, however, are not intended to limit the generally broad scope of the present invention in strict accordance therewith.

*Example I*

A mixture of 252 g. of dicyclopentadiene and 501 g. of trans-dichloroethylene in a glass vessel was sealed into a rotating autoclave and heated at 180 to 200° C. during 4.6 hours. The product was washed with water, dried and distilled. There was obtained 204 g. (33% of the theory based on the charge) of a liquid compound boiling at about 189–190° C. at atmospheric pressure. This consisted largely of trans-5,6-dichlorobicyclo[2.2.1]-2-heptene. 36 g. of magnesium turnings and 500 cc. of absolute ether were placed in a reaction vessel equipped with stirring means after which 15.0 g. of iodine was slowly added to the stirred mixture. During the addition of the iodine (10 min.) the temperature of the mixture rose from 27° to 32° C. while the solution turned a dark red-amber color. The mixture was stirred for an additional 10 minutes during which the solution became colorless. 16.0 g. of trans-5,6-dichlorobicyclo[2.2.1]-2-heptene was added dropwise during a period of three hours, during which time the temperature of the reaction mixture was maintained at 30–35° C. by occasionally cooling with ice-water. Upon completion of the addition of the dihalobicycloalkene the mixture was stirred for an additional 8 hours during which time the mixture became a white gel-like material. Ice-water was added to the product, with stirring, until it was hydrolyzed, after which the ether layer was separated from the aqueous layer which was then extracted with ether. The combined ether solutions were washed with sodium thiosulfate solution and water, then dried with anhydrous potassium carbonate, and subjected to fractional distillation in an appropriate apparatus. There was obtained 65 g. (72% yield) of bicyclo[2.2.1]-2,5-heptadiene boiling at 89–90° C.: $n_D^{20}=1.4698$; $d_4^{20}$ 0.9056. The product crystallized when cooled to approximately −30° C. The product was analyzed.

Found: C, 91.24; H, 8.76. Calculated for $C_7H_8$: C, 91.25; H, 8.75.

*Example II*

A mixture of 250 g. of cyclopentadiene and 552 g. of cis-dichloroethylene was heated at 180 to 200° C. in the manner described in Example I for the condensation of dicyclopentadiene and trans-dichloroethylene. There was obtained 114 g. of dichlorobicycloheptene, largely endo-cis-5,6-dichlorobicyclo[2.2.1]-2-heptene, boiling at about 220–222° C. and melting at about 73° C. Analysis of this crystalline 5,6-dichlorobicyclo[2.2.1]-2-heptene, which is a new composition of matter, gave the following values:

Found: C, 51.49; H, 5.11; C, 43.60. Calculated for $C_7H_8Cl_2$: C, 51.56; H, 4.94; Cl, 43.50.

A solution of 52 g. of the endo-cis-5,6-dichloro[2.2.1]-2-heptene in 180 cc. of absolute ether was added during 3 hours to a stirred mixture of 18.0 g. of magnesium turnings and 300 cc. of absolute ether which had been treated with 12 g. of iodine in the manner described in Example I. The product was stirred for an additional 8 hours after which it was worked up as described in Example I. There was obtained 14 g. (51% yield) of bicyclo[2.2.1]-2,5-heptadiene, boiling at 89° C.

I claim as my invention:

1. A process for the preparation of a non-conjugated bicycloalkadiene which comprises reacting a dehalogenating agent comprising magnesium metal and magnesium iodide under anhydrous conditions with a dihalobicycloalkene produced by the condensation of a conjugated cycloalkadiene selected from the group consisting of cyclopentadienes and cyclohexadienes with a dihaloalkene having the general formula:

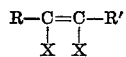

in which R and R′ are independently selected from the group consisting of hydrogen and alkyl radicals and X is a halogen radical, and recovering the resultant non-conjugated bicycloalkadiene.

2. A process for the preparation of a non-conjugated bicycloalkadiene which comprises reacting a dehalogenating agent comprising magnesium metal and magnesium iodide under anhydrous conditions with a dichlorobicycloalkene produced by the condensation of a conjugated cycloalkadiene selected from the group consisting of cyclopentadienes and cyclohexadienes with a dichloroalkene which is represented by the formula:

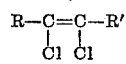

in which R and R′ are independently selected from the group consisting of hydrogen and alkyl radicals, and recovering the resultant non-conjugated bicycloalkadiene.

3. A process for the preparation of a non-conjugated bicycloalkadiene which comprises reacting a dehalogenating agent comprising magnesium metal and magnesium iodide under anhydrous conditions with a dibromobicycloalkene produced by the condensation of a conjugated cycloalkadiene selected from the group consisting of cyclopentadienes and cyclohexadienes with a dibromoalkene which is represented by the formula:

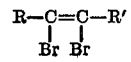

in which R and R′ are independently selected from the group consisting of hydrogen and alkyl radicals, and recovering the resultant non-conjugated bicycloalkadiene.

4. A process for the preparation of a non-conjugated bicycloalkadiene which comprises reacting a dehalogenating agent comprising magnesium metal and magnesium iodide under anhydrous conditions with a dihalobicycloalkene produced by the condensation of a conjugated 1,3-cyclopentadiene with a dihaloalkene having the general formula:

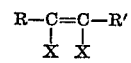

in which R and R′ are independently selected from the group consisting of hydrogen and alkyl radicals and X is a halogen radical, and recovering the resultant non-conjugated bicycloalkadiene.

5. A process for the preparation of a non-conjugated bicycloalkadiene which comprises reacting a dehalogenating agent comprising magnesium metal and magnesium iodide under anhydrous conditions with a dihalobicycloalkene produced by the condensation of a conjugated 1,3-cyclohexadiene with a dihaloalkene having the general formula:

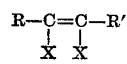

in which R and R′ are independently selected from the group consisting of hydrogen and alkyl radicals and X is a halogen radical, and recovering the resultant non-conjugated bicycloalkadiene.

6. A process for the preparation of a non-conjugated bicycloalkadiene which comprises reacting magnesium and magnesium iodide in absolute ether with a dihalobicycloalkene produced by the condensation of 1,3-cyclopentadiene with a dihaloalkene which is represented by the formula:

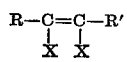

in which R and R′ are independently selected from the group consisting of hydrogen and alkyl radicals and X is a halogen radical, and recovering the resultant non-conjugated bicycloalkadiene.

7. A process for the preparation of bicyclo[2.2.1]-2,5-heptadiene which comprises reacting 5,6-dichlorobicyclo[2.2.1]-2-heptene, produced by the condensation of 1,3-cyclopentadiene with a 1,2-dichloroethylene, with magnesium and magnesium iodide in absolute ether, and recovering the resultant bicyclo[2.2.1]-2,5-heptadiene.

8. A process for the preparation of bicyclo[2.2.1]-2,5-heptadiene which comprises reacting 5,6-dichlorobicyclo[2.2.1]-2-heptene produced by the condensation of 1,3-cyclopentadiene with cis-dichloroethylene, with magnesium and magnesium iodide in absolute ether, and recovering the resultant bicyclo[2.2.1]-2,5-heptadiene.

9. A process for the preparation of bicyclo[2.2.1]-2,5-heptadiene which comprises reacting the 5,6-dichlorobicyclo[2.2.1]-2-heptene produced by the condensation of 1,3-cyclopentadiene with trans-dichloroethylene, with magnesium and magnesium iodide in absolute ether, and recovering the resultant bicyclo[2.2.1]-2,5-heptadiene.

10. A process for the preparation of bicyclo[2.2.1]-2,5-heptadiene which comprises reacting 5,6-dichlorobicyclo[2.2.1]-2-heptene with magnesium and magnesium iodide in absolute ether, and recovering the resultant bicyclo[2.2.1]-2,5-heptadiene.

11. A process for the preparation of bicyclo-(2.2.1)-2,5-heptadiene which comprises reacting a dichlorobicyclo-(2.2.1)heptene with magnesium-magnesium iodide reagent under anhydrous conditions and recovering a resulting dehalogenation product.

(References on following page)

References Cited in the file of this patent

UNITED STATES PATENTS

| | | |
|---|---|---|
| 2,336,208 | Alder | Dec. 7, 1943 |
| 2,419,198 | Bowman | Apr. 22, 1947 |
| 2,717,851 | Lidov | Sept. 13, 1955 |
| 2,730,548 | Bluestone et al. | Jan. 10, 1956 |

FOREIGN PATENTS

| | | |
|---|---|---|
| 701,211 | Great Britain | Dec. 23, 1953 |

OTHER REFERENCES

Fuson et al.: Jour. Amer. Chem. Soc., vol. 63, 1941, pages 2650–2652; C. A. vol. 36 (1942), page 444(9).

Inhoffen et al.: Chem. Berichte, vol. 81JG, 1948, pages 507–508; C. A., vol. 43, 1949, page 5361(i).

Kharasch et al.: Grignard Reactions of Non Metallic Substances, October 1954, Prentice-Hall, Inc., N.Y., p. 1053 only relied on.